United States Patent [19]

Criscimagna et al.

[11] 4,150,363

[45] Apr. 17, 1979

[54] REDUCED CONNECTION FOR 22 CHARACTER GAS PANEL

[75] Inventors: Tony N. Criscimagna, Woodstock; James B. Trushell, Saugerties, both of N.Y.

[73] Assignee: International Business Machines Corporation, Armonk, N.Y.

[21] Appl. No.: 800,765

[22] Filed: May 26, 1977

[51] Int. Cl.[2] .......... G06F 3/14

[52] U.S. Cl. .......... 340/756; 340/166 EL; 340/752; 340/789

[58] Field of Search .......... 340/324 R, 324 M, 336, 340/166 EL; 58/50, 152

[56] References Cited

U.S. PATENT DOCUMENTS

| | | | |
|---|---|---|---|
| 3,760,403 | 9/1973 | Kippenhan | 340/336 |
| 3,878,430 | 4/1975 | Hirose | 340/324 M |
| 3,898,642 | 8/1975 | Dorey et al. | 340/336 |
| 3,934,241 | 1/1976 | Weigert | 340/166 EL |
| 3,987,617 | 10/1976 | Slob | 340/324 M |

*Primary Examiner*—Marshall M. Curtis

*Attorney, Agent, or Firm*—Joseph J. Connerton

[57] ABSTRACT

In driving gas panel or plasma display devices, characters are generated on the panel display as a sequence of dots by applying appropriate drive signals to selected orthogonal conductors, each conductor requiring an associated driver. In a low character count small plasma display such as a single row display utilizing a 5×7 dot character matrix, a significant load is presented to the horizontal drivers, while a substantial number of drivers are required to drive the vertical axis. To improve the load distribution and increase the drive efficiency of such a system, the horizontal conductors are divided into four distinct groups, with associated drivers, while a single set of vertical conductors is used to drive the vertical conductors, which are positioned to intersect each of the groups of horizontal conductors. The individual load requirements as well as the number of vertical drivers are reduced by a factor of four at a nominal increase in the number of horizontal drivers, thereby providing a significant cost reduction. The specific wiring pattern used to achieve this result on a plasma display device is disclosed herein.

10 Claims, 3 Drawing Figures

REDUCED CONNECTION FOR 22 CHARACTER GAS PANEL

CROSS REFERENCE TO RELATED APPLICATIONS

Application Ser. No. 729,056 (IBM Docket Ki976001) "Gas Panel Single Ended Drive System" filed by W. R. Lamoureux et al Oct. 4, 1976.

BACKGROUND OF THE INVENTION

Conventional a.c. plasma display drive systems are based on a matrix concept involving a pair of arrays of parallel conductors, such arrays being disposed on glass plates and positioned substantially orthogonal to one another and separated by a confined gaseous medium. Selection of one drive line from each array uniquely specifies a display cell, and a plurality of cells forms a character within a character matrix. Because of the matrix characteristic of conventional plasma displays, the conductor arrays must be uniquely selectable and a driver is normally required for each conductor in each array. Such drive systems have maximum efficiency in large character displays comprising many rows of multi-character capacity and minimum efficiency in a low character display such as a single row display, since the same number of vertical drivers are required for a single row as are required for 12 or 40 rows of characters. In addition to the vertical driver problem, a second problem associated with driving small plasma display devices relates to the load requirements for the individual drivers in the horizontal axis. Thus, for example, using a single line display of 24 characters having a 5×7 dot matrix, 120 drivers are required for the vertical drive system and only 7 drivers for the horizontal drive system, each driver being required to drive up to 150 display cells, with a further requirement that all drive lines be terminated on one or alternate sides of the panel edge.

Display matrix addressing systems for reducing the required number of drivers have been proposed, one such system being described in the IBM Technical Disclosure Bulletin, Vol. 12, No. 2, July, 1969, pages 349–350. However, such a system must be translated into practical conductor patterns for the two plates of the panel. Such artwork is relatively complex, and individual connections to various parts of the panel must be properly terminated with minimum crossovers.

SUMMARY OF THE INVENTION

In accordance with the present invention, a single line 24-character plasma display is electrically "squared" into four six character groups whereby the vertical driver requirements are decreased to 25 percent of the normal matrix requirement of one driver per vertical line. The individual groups of six characters are addressed in one direction for characters 1–6 and 13–18, (groups 1 and 3) and in the opposite direction for characters 7–12 and 19–24 (groups 2, 4) to conform to the specific vertical line pattern. Each of the character groups is individually addressed by associated horizontal drivers, so that the horizontal load per driver is reduced to 25 percent of the normal load, but requires some increase in horizontal driver requirements. The vertical driver array is addressed from one side of the panel and the configuration is designed to intersect each of the individual character groups as compared to the horizontal drivers which are driven from opposite edges of the panel. The unique addressing method for electrically "squaring" the display and the specific wiring configuration used to achieve this effect are described herein.

Accordingly, a primary object of the present invention is to provide an improved gas panel driving system having a substantially reduced number of drivers.

Another object of the present invention is to provide a unique wiring configuration for a gas panel to implement an electrically squared panel configuration.

The foregoing and other objects, features and advantages of the present invention will be apparent from the following more particular description of a preferred embodiment of the invention as illustrated in the accompanying drawings.

DESCRIPTION OF A PREFERRED EMBODIMENT

Figure 1:
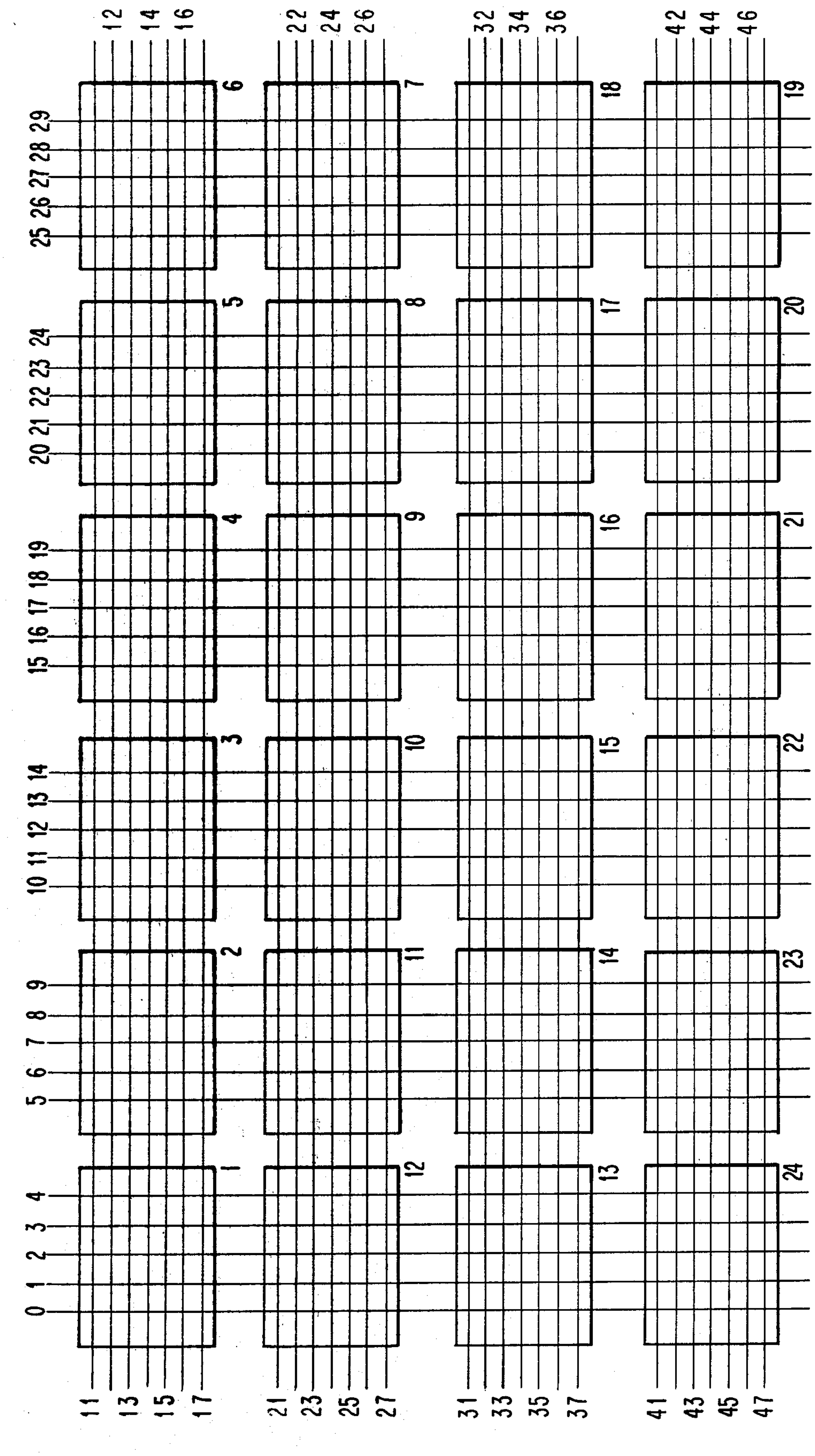
FIG. 1 is a representative view of the manner in which a single row of 24 characters is electrically squared into four groups of six characters.

Referring now to the drawings and more particularly to FIG. 1 thereof, the invention is described in terms of a preferred embodiment comprising a single line display of 24 characters in which alphanumeric characters are generated and displayed using a 5×7 matrix of cells, although it will be appreciated that the invention is not limited to single line display panels. Before proceeding with the description of the present invention, the operation of gaseous discharge or plasma display devices will be briefly described. In gaseous discharge display devices, arrays of parallel conductors oriented at substantially transverse angles to each other are disposed on opposite sides of a gas filled panel, the conductors being insulated from direct contact with the gas by a layer of dielectric.

One example of such a gaseous display device is described in U.S. Pat. No. 3,559,190 "Gaseous Display and Memory Apparatus" issued Jan. 26, 1971 to Donald L. Bitzer et al. Individual discharge sites located at coordinate intersections on said panel are selectively fired by application of drive signals to the associated conductors, and, when fired, produce a wall charge effect wherein the charge particles, electrons and ions, are attracted to the reverse polarity cell walls. The wall charge potential combines with a lower voltage sustain signal to continuously discharge the selected cells. By selecting the cells in the sequence to delineate alphanumeric characters, an alphanumeric display is provided. In addition to the forenoted Bitzer et al patent, gas panel fabrication is described in U.S. Pat. No. 3,837,724 filed by Peter H. Haberland et al and assigned to the assignee of the instant invention. A system for addressing the individual conductors on a gaseous discharge display device is described in U.S. Pat. No. 3,973,253 "Floating Addressing System for Gas Panel" filed by Tony N. Criscimagna et al and also assigned to the assignee of the instant invention. These patents are identified as relevant to the environment of the instant invention, and are incorporated by reference into the instant application.

Returning now to FIG. 1, the concept employed for reducing the driver requirements operates as follows. Twenty-four individual 5×7 character matrices are illustrated as character blocks 1-24, each of the blocks representing the characters in their normal sequence for display, on the single display line, i.e., left to right. Each of the four groups of six blocks requires seven horizontal conductors labeled 11-17. 21-27. 31-37 and 41-47 representing groups 1-4 respectively, and 30 vertical conductors labeled 0-29. As shown, the vertical drive lines for the first group, blocks 1-6, are driven in an ascending configuration 0-29, as are blocks 13-18; the vertical conductors for blocks 7-12 and 19-24 are driven in a descending sequence, i.e., right to left 29-0. Since each of the four groups of six character blocks utilizes seven horizontal drive lines, a total of 28 horizontal drivers is required for the four groups. Using a 5×7 matrix, each character block requires five vertical drivers, and in the electrical squaring configuration of the instant invention, each of the vertical drivers services four individual character blocks. Thus vertical drivers 0-4 service blocks 1, 12, 13, 24; conductors 5-9 service blocks 2, 11, 14, 23; conductors 10-14 service blocks 3, 10, 15, 22; conductors 15-19 service blocks 4, 9, 16, 21; conductors 20-24 service blocks 5, 8, 17, 20 and conductors 25-29 service blocks 6, 7, 18 and 19. Thus, rather than utilizing 120 vertical drivers as required in conventional matrix driving systems, only 30 vertical drivers are employed. While FIG. 1 illustrates in schematic form the manner in which the individual characters would be driven, this obviously does not represent the wiring configuration for a one-line display. Such a wiring pattern would produce a four line six character per line display if the horizontal and vertical drive lines were positioned on the corresponding glass plates in the manner shown in FIG. 1. The actual horizontal and vertical conductor configurations required are shown in FIGS. 2 and 3, FIG. 2 illustrating the horizontal conductor array pattern and FIG. 3 the vertical conductor array pattern for implementing the schematic squaring effect into an actual wiring configuration for a single line display.

Figure 2:
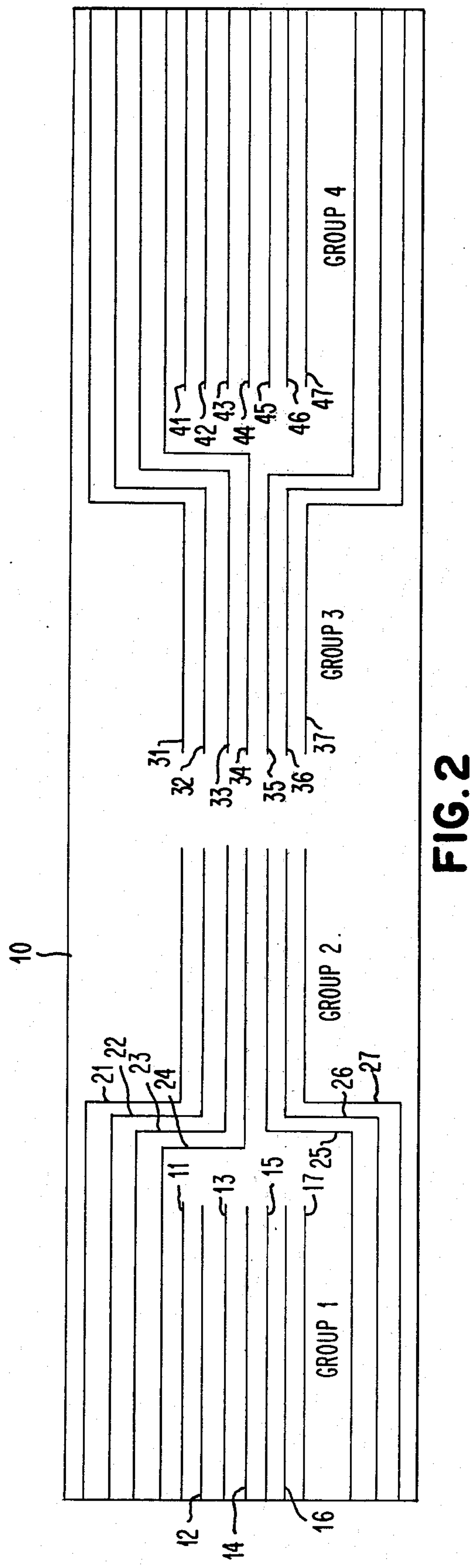
FIG. 2 is a drawing of the horizontal conductor configuration on one of the substrates utilized to achieve the squaring effect illustrated in FIG. 1.

Referring now to FIG. 2, the horizontal conductor array used to generate the 24 characters is illustrated. In view of the interdependent relationship between the horizontal and vertical arrays however, reference will be made to FIG. 3 which illustrates the corresponding vertical conductor array of the instant invention, during this description. In an actual gas panel embodiment, the horizontal conductor array will be positioned on one of the glass plates 10, while the vertical conductor array will be formed on the opposing glass plate 20 with the respective intersections of the horizontal and vertical conductors designating the location of the gas cells. The location of the cells would be defined by overlaying FIGS. 2 and 3. Each of the four group conductors are illustrated in FIG. 2, the first digit identifying the group and the second the 7 matrix conductors, and the character displays will be generated sequentially left to right from groups 1, 2, 3, and 4. As shown in FIG. 1, each of the individual groups 1, 2, 3, 4 utilize the 30 associated vertical conductors designated to generate the six character display for each group. Accordingly, each set of group conductors must be sufficiently long to accommodate the 30 common vertical conductors shown in FIG. 3. It will be appreciated that the individual conductor configurations of FIGS. 2 and 3 are not drawn precisely to scale, but are merely representative of the concept of the subject invention. The group 1 and group 2 conductors are driven from the extremely left hand portion of the display, while the group 3 and group 4 conductors will be driven from the extreme right hand portion of the display. While not shown in the drawing, the horizontal drive conductors utilize conventional termination pads at the panel extremities to connect to the driving source either directly or through flexible cabling and conventional connector assemblies. Since the group 1 conductors will form the initial set of six characters, the group 1 conductors 11-17 are formed on the actual viewing area which comprises the area from conductors 1 through conductor 7 of each group. The length of the horizontal conductors is such that provision is made for intersections with the corresponding vertical conductors 0-29 shown directly below in FIG. 3. Thus the maximum load to be driven by each of the horizontal conductors will be 30 cells, only one-fourth of the load of 120 cells which would be required by conventional driving means. The distance required by group 1 will be approximately one-fourth of the available display distance although, as previously indicated, the specific drawing shown in FIGS. 2 and 3 is not precisely to scale. The group 2 conductors 21-27 also originate at the lefthand extremity of plate 10, conductors 21, 22, 23, and 24 being shown above the group 1 conductors, conductors 25, 26, and 27 being shown below the group 1 conductors. However, the conductors turn in the area between groups 1 and 2 such that they are effectively in line with the group 1 conductors and positioned immediately to their right, corresponding to the location of the vertical conductors in FIG. 3. Note that as shown in FIG. 1, the group 2 conductors 21-27 increase from right to left so that they are driven by vertical conductors 29-0, conductors 29-0 being shown in that specific direction in FIG. 3. The group 3 conductors 31-37 are located immediately to the right of the group 2 conductors, and terminate in the right side of the panel, conductors 31-34 being the four top conductors and conductors 35-37 the three bottom conductors for the group. Since the group 3 blocks progress in the same direction as group 1, as shown in FIG. 3. The group 4 conductors 41-47 define the horizontal component of the last six characters, and are positioned at the right hand extremity of the plate 10 in line with the conductors of the remaining three groups. Likewise as shown in FIG. 1, character blocks 19-24 in group 4 progress from right to left such that they are combined with associated vertical conductors 29-0 as shown in FIG. 3. Thus the vertical conductor array shown in FIG. 3 provides the same type of group selection shown schematically in FIG. 1, but the actual display matrices will be defined by the intersection of the horizontal conductors in the respective four groups and the common vertical conductors which are interwoven in the manner illustrated in FIG. 3.

Figure 3:
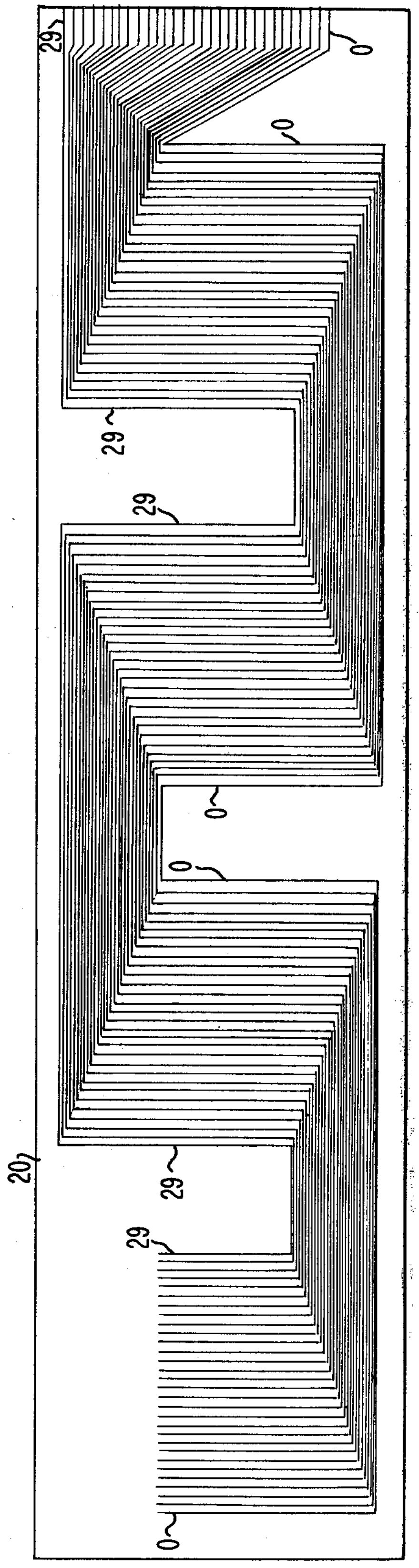
FIG. 3 illustrates the vertical conductor configuration on the other substrate and utilized to achieve the squaring effect illustrated in FIG. 1.

Referring now to FIG. 3, the conductor array of vertical conductors 0-29 is interleaved so that the 30 conductors are associated with and in fact intersect with the horizontal conductors in each of the four groups. Since seven horizontal lines are associated with each of the groups, each of the 30 vertical conductors defines twenty-eight cells, i.e., seven in each of groups 1-4, so that the load presented is substantially nominal. The schematic configuration shown in FIG. 1 necessitates that each horizontal group be driven in an opposite direction from the immediate adjacent group, i.e., group 2 is driven from vertical conductors 29–0, while group 1 is driven by conductors 0–29, etc. The portions of the vertical display plate 20 used for interconnecting the respective vertical conductors corresponds to the non-viewable area such as that shown above and the seven horizontal conductors of each group in FIG. 2. Rather than identify individual conductors within the vertical groups, only the conductors 0 and 29 are shown in the drawing, although it will be appreciated that the intervening vertical conductors are sequentially related. The vertical conductors terminate in termination pads on the right hand extremity of glass plate 20, and are similarly adaptable for being driven either directly or through cabling and connector assemblies by a conventional driving and addressing system such as that disclosed in the referenced Criscimagna et al U.S. Pat. No. 3,973,253 or the referenced Application Ser. No. 729,056 (IBM Docket Ki976001).

The subject invention thus provides a solution to the dual problem of excessive load on the horizontal drive conductors, and the problem of excessive drivers required to drive the vertical conductor assembly. In the specific embodiment, the vertical conductors are reduced from 120 to 30, while the corresponding vertical conductors will be increased from 7 to 28, the overall combination still providing a significant cost saving and improved load driving capability for the display. Other configurations utilizing the technique of the instant invention would obtain corresponding reductions in drivers and loads for the respective drive lines.

While the invention has been particularly shown and described with reference to a preferred embodiment thereof, it will be understood by those skilled in the art that other changes in form and detail may be made therein without departing from the spirit and scope of the invention.

What is claimed is:

1. A system configuration for reducing the number of drivers required to drive a gaseous discharge display device in which a display is generated by selective application of drive signals applied to substantially orthogonal conductor arrays disposed on opposite sides of a gas filled panel, the intersections of conductors on each of said conductor arrays defining discharge cells, the combination comprising, means for electrically dividing the display into a groups of characters format, each of the characters within each of said groups being composed by selective energization of cells within a dot character matrix, a plurality of individual drive lines for addressing one axis of each of said groups and a plurality of common drive lines for addressing the other axis of all of said groups, said common drive lines being interleaved through each of said associated conductor groups whereby energization of selected cells is effected by selective energization of one of said group conductors and one of said common conductors.

2. Apparatus of the type claimed in claim 1 wherein said plurality of individual drive lines relates to the horizontal conductor array.

3. Apparatus of the type claimed in claim 1 wherein said common drive lines relates to the vertical conductor array.

4. In a gaseous discharge display device comprising first and second support plates having dielectric coated conductor arrays disposed thereon, said first and second conductor arrays being oriented relative to each other in substantially orthogonal axes to define a plurality of separately addressable discrete discharge sites at the respective intersections thereof, the improvement comprising, a plurality of conductor groups associated with said first conductor array, each of said groups comprising conductors for one of said orthogonal axes, a single conductor group for providing said second conductor array for said second orthogonal axis, said single conductor group being interleaved through each of said plurality of first conductor groups, the selective actuation of conductors in one of said first conductor groups and said single conductor group ionizing selected discharge sites at the intersection of said conductors, the sequential addressing of said plurality and said single conductor groups providing a display along one axial dimension of said display device.

5. A device of the type claimed in claim 4 wherein said plurality of conductor groups comprise the horizontal conductor array and said single conductor group comprises the vertical conductor array.

6. In a gaseous discharge display device in which selected discharge sites defined by the intersections of substantially orthogonal conductor arrays disposed on opposite sides of a gaseous envelope are ionized by electrical potentials applied to selected conductors in said arrays, the improvement in said conductor arrays for reducing the number of drivers required to generate said electrical potentials wherein, the conductors along one axis of said display device are divided into a plurality of groups, each of said conductors in each of said groups being individually addressable and a group of common conductors disposed along said orthogonal axis, said group of common conductors being interleaved through each conductor in each of said plurality of groups of conductors to permit selective ionization of said discharge sites by said electrical potentials.

7. A gaseous discharge display device of the type claimed in claim 6 wherein each of said groups comprise a portion of the display capacity of said display device.

8. A gaseous discharge display device of the type claimed in claim 6 wherein the conductors in each of said groups are aligned along the horizontal axis and comprise the horizontal conductor array.

9. A device of the type claimed in claim 8 wherein said group of interleaved common conductors are disposed along the vertical axis in the areas covered by each of said groups and comprise the vertical conductor array.

10. A device of the type claimed in claim 9 wherein said common conductors are interconnected between said groups of conductors in a non-viewable area of said display.

* * * * *